(12) United States Patent
Bar-Yakov et al.

(10) Patent No.: US 6,737,456 B2
(45) Date of Patent: May 18, 2004

(54) FIRE-RETARDANT POLYOLEFIN COMPOSITIONS

(75) Inventors: Yoav Bar-Yakov, Lehavim (IL); Smadar Hini, Beer Sheva (IL)

(73) Assignee: Bromine Compounds Ltd., Beer-Sheba (IL)

( * ) Notice: Subject to any disclaimer, the term of this patent is extended or adjusted under 35 U.S.C. 154(b) by 230 days.

(21) Appl. No.: 09/793,386

(22) Filed: Feb. 27, 2001

(65) Prior Publication Data

US 2002/0169240 A1 Nov. 14, 2002

(51) Int. Cl.$^7$ ................................................ C08K 5/521
(52) U.S. Cl. ........................................ 524/144; 524/127
(58) Field of Search .................................. 524/144, 127

(56) References Cited

U.S. PATENT DOCUMENTS

| | | | |
|---|---|---|---|
| 4,430,467 A | | 2/1984 | Lesniewski et al. |
| 5,393,812 A | | 2/1995 | Haley et al. |
| 6,139,998 A | * | 10/2000 | Mochizuki et al. ........... 430/56 |
| 6,346,581 B1 | * | 2/2002 | Tsunogae et al. ......... 525/332.1 |

FOREIGN PATENT DOCUMENTS

| | | | |
|---|---|---|---|
| GB | 2 085 898 A | | 5/1982 |
| JP | 63-27543 | | 2/1988 |
| JP | 70620 | * | 3/1993 |
| JP | 5-70620 | * | 3/1993 |
| WO | WO 98/17718 | | 4/1998 |

OTHER PUBLICATIONS

Jürgen Troitzsch, *International Plastics Flammability Handbook*, 1983, p. 45, Hanser Publishers, New York.

Jürgen Troitzsch, *International Plastics Flammability Handbook*, 1983, p. 56, Hanser Publishers, New York.

Glade E. Squires, "Flame Retardant Polypropylene—A New Approach that Enhances Form, Function and Processing", *Proceedings of the Flame Retardants 1996 Conference*, p. 107, published by Science Communications Limited.

*Proceedings of the Flame Retardants 2000 Conference*, p. 182, 89, published by Interscience Communications.

European Patent Office: Patent Abstracts of Japan, Abstract for JP 07 100897, "Manufacture of Fire Retardant Olefin Resin Foam", Sekisui Chem Co Ltd, Apr. 18, 1995.

European Patent Office: Patent Abstracts of Japan, Abstract for JP 05 070620, "Composition for Flame–Retardant Resin Foamed Body, Flame–Retardant Resin Foamed Body and Its Production", Toray Ind Inc, Mar. 23, 1993.

European Patent Office: Patent Abstracts of Japan, Abstract for JP 06 136188, "Flame Retardant Resin Composition", Tokuyama Soda Co Ltd, May 17, 1994.

Abstract for JP 05 070623, "Composition for Flame–Retardant Resin Foamed Body, Flame–Retardant Resin Foamed Body and its Production", Toray Ind Inc, Mar. 23, 1993.

\* cited by examiner

*Primary Examiner*—Peter Szekely
(74) *Attorney, Agent, or Firm*—Browdy and Neimark

(57) ABSTRACT

The present invention relates to A flame-retardant polyolefin composition or to a fiber that are comprised of (i) at least one polyolefin; (ii) a tris(tribromoneopentyl) phosphate; and (iii) afree radical source. The composition may further comprise an additional flame-retarding compound, which may be selected from an inorganic or an organic compound. It may further comprise ultra violet protectants. The invention is also related to a textile object comprised of a plurality of said fibers and to injection or extruded molded articles produced from said flame-retardant compositon.

45 Claims, No Drawings

FIRE-RETARDANT POLYOLEFIN COMPOSITIONS

FIELD OF THE INVENTION

This invention is in the field of flame-retardants. More particularly, it relates to fire-retardant polyolefin compositions.

BACKGROUND OF THE INVENTION

Brominated organic compounds are commonly used as additives for retarding and slowing the flammability of plastic compounds they are blended with. They may be blended alone or in combination with other brominated or non-brominated flame-retardants in a synergistic manner. Optionally, additional compounds may be added to the blend in order to achieve good flame-retarding results and maintain durability. In general brominated aliphatic compounds are more effective flame-retardants than brominated aromatic compounds since they tend to break down more easily (International Plastics Flammability Handbook, $2^{nd}$ edition, Jurgen Troitzsch, p. 45).

GB 2,085,898 discloses a self-extinguishing polyolefin composition containing polypropylene, a brominated arene together with $Sb_2O_3$ and a free radical initiator. JP 63/027,543 discloses a flame-retardant polyolefin composition comprising a blend of chlorinated polyethylene and polyethylene, together with an organic brominated compound and $Sb_2O_3$, a free radical initiator and a metal hydroxide. U.S. Pat. No. 4,430,467 discloses a self-extinguishing propylene polymer where the propylene polymer is blended with 5,6-dibromonorbornane and a free radical initiator. This flame-retardant has low bromine content and it is not melt blendable.

Another flame-retardant widely used in polyolefins is Tetrabromobisphenol A bis (2,3-dibromopropyl ether) (International Plastics Flammability Handbook, $2^{nd}$ edition, Jurgen Troitzsch, p. 56), but it suffers from heavy blooming and has limited UV stability. By "blooming" it is meant that a separation of the additive from the polymer matrix occurs, which has a negative effect on the surface appearance of the plastic articles. Many of the above mentioned flame-retardants require the additional use of antimony trioxide as a synergist.

Another flame-retardant used in polyolefins is tris(tribromoneopentyl) phosphate, which is also known as tris(3-bromo-2,2(bromomethyl)propyl) phosphate. Some of the advantages of this flame-retardant are: minimal impact upon the properties and the processing of the polymer; easily extrudable with polypropylene; free flowing powder; melt and mix with polypropylene resin to give a uniform product; exceptional heat stability which results in processing stability, storage stability, and performance permanence; it can be used without antimony trioxide, for instance, for the production of fine denier polypropylene fibers (Proceedings of the Flame Retardants '96 Conference, p. 107).

Only a combination of very high loadings of tris(3-bromo-2,2 (bromomethyl) propyl) phosphate with antimony trioxide give rise to a composition that may pass the UL (Underwriters Laboratory) 94 V-0 test. Such a composition is not commercially competitive.

WO 98/17,718 discloses adding a halogenated flame-retardant having at least one halogen atom attached to an aliphatic carbon atom to tris(tribromoneopentyl) phosphate in order to achieve V-0 in the UL 94 test in a polyolefin at a low loading. U.S. Pat. No. 5,393,812 discloses a composition of polyolefin, a phosphate or phosphonate ester of a halogenated organic compound and a light stabilizer of a certain type.

SUMMARY OF THE INVENTION

It is an object of the present invention to provide non-blooming flame-retardant polyolefin formulations having good flame-retardancy, excellent UV and light stability, and excellent thermal stability.

It is yet another object of the present invention to significantly improve the flame-retardancy of tris (tribromoneopentyl) phosphate, which is known to be less efficient than other commercial flame-retardants in similar applications (Proceedings of the Flame Retardants 2000 Conference, p. 82).

It is a further object of the present invention to achieve very short burning time in polypropylene objects.

Still yet another object of the present invention is to provide a polyolefin with a higher standard of flame-retardancy, such as UL 94 V-0, and excellent thermal stability with a low amount of halogenated aliphatic compounds and without the use of halogenated aromatic compounds.

In addition a further object is to provide a flame-retardant polyolefin formulation containing tris(tribromoneopentyl) phosphate and polyolefin that does not include antimony trioxide.

Thus, the flame-retardant polyolefin composition of the present invention comprises:

(a) At least one polyolefin;
(b) tris(tribromoneopentyl) phosphate; and
(c) free radical source The polyolefin may be a polymer blend comprising at least 20% (w/w) polypropylene. It may either be a homopolymer or a copolymer. The amount of the tris (tribromoneopentyl) phosphate is preferably in the range of about 0.5% to about 20% (w/w) of the entire composition, and the amount of the free radical source is in the range of between about 0.01% to about 4% (w/w) and preferably in the range of between about 0.05% to about 2% (w/w).

The composition may further comprise another fire-retardant compound, which may serve as a synergist. In such a composition, the amount of the organic brominated compound may be reduced, thus leading to a lower amount of bromine in the composition, which makes the composition more economic.

DETAILED DESCRIPTION OF THE INVENTION

The present invention deals with flame-retardant polyolefin compositions, which, due to their unique additives to the polyolefin and the percentage in the composition, retain most of the physical characteristics of a pure polyolefin polymer while attaining strict fire-retardance standards. The flame-retardancy properties of the olefin composition are achieved by selecting an appropriate brominated compound and a free radical source. The brominated compound is tris(tribromoneopentyl) phosphate which is also known as FR-370 (manufactured by Dead Sea Bromine Group). The compound is a very stable brominated aliphatic compound, which does not undergo chemical reactions common to aliphatic brominated compounds. This stem from the fact that there is no hydrogen atom bound to the carbon atom, which is in the β-position in relation to the bromine, thus avoiding the possible elimination of HBr.

The free radical source in accordance with the present invention is an organic compound which is stable at processing temperatures of about from 150° C. to about 250° C., and decomposes above these temperatures (at about from 220° C. to about 350° C.) to give relatively stable free radicals. Examples of free radical initiators are 2,3-dimethyl-2,3-diphenyl-butane and 2,3-dimethyl-2,3-diphenyl-hexane.

The polyolefins useful in this invention (sometimes also referred to as "polyolefin resins") may be derived from a variety of monomers especially from propylene, ethylene, butene, isobutylene, pentene, hexene, heptene, octene, 2-methyl propene, 2-methyl butene, 4-methylpentene, 4-methyl hexene, 5-methyl hexene, bicyclo (2,2,1)-2-heptene, butadiene, pentadiene, hexadiene, isoprene, 2,3 dimethyl butadiene, 3,1 methyl pentadiene 1,3,4 vinyl cyclo hexene, vinyl cyclohexene, cyclopentadiene, styrene and methyl styrene. The polyolefins include copolymers produced from any of the foregoing monomers and the like, and further include homopolymer blends, copolymer blends, and homopolymer-copolymer blends. The polyolefins may be in a molding grade, fiber grade, film grade or extrusion grade The preferred polyolefins are polypropylene and polyethylene, including atactic, syndiotactic and isotactic polypropylene, low density polyethylene, high density polyethylene, linear low density polyethylene, block copolymers of ethylene and propylene, and random copolymers of ethylene and propylene. The polyolefins useful in this invention may be produced using a variety of catalytic processes including metallocene-catalyzed processes. The polymers may have a broad range of melt flow indexes (MFI) but will typically have MFI values in the range 0.5 to 30. The invention finds particular applications in polymers, which are fabricated into finished articles by molding processes. Preferred grades are fiber grades, film grades, molding grades, and extrusion molded grades.

The addition of tris(tribromoneopentyl) phosphate together with the free radical initiator results in a polyolefin composition having a high degree of flame-retardancy.

This flame-retardancy can be further enhanced by the use of other flame-retardant compounds which may serve as synergists such as antimony compounds (e.g. antimony-trioxide, -tetraoxide, -pentaoxide, and sodium antimonate), tin compounds (e.g. tin-oxide and -hydroxide, dibutyl tin maleate), molybdenum compounds (e.g. molybdenum oxide, ammonium molybdate), zirconium compounds (e.g. zirconium-oxide and -hydroxide), boron compounds (e.g. zinc-borate, barium-metaborate), zinc compounds such as zinc stannate, silicon compounds such as silicon oil, fluoro compounds such as polytetrafluoroethylene, and hydroxystannate or any mixtures of two or more of them. Such compounds serve as synergists, which reduce the overall, required amount of flame-retardant compounds in the polyolefin composition.

The composition may further comprise other halogenated or non-halogenated flame-retardant compounds such as but not limited to tetrabromobisphenol A bis (2,3-dibromopropyl ether), brominated expoxy resins and related end capped derivatives, brominated polycarbonate resins and their end capped derivatives, brominated diphenyl ethers, brominated diphenyl ethanes, tetrabromobisphenol A, hexabromocyclododecane and their various thermally stabilised grades, BT-93 (flame retardant produced by Albemarle), poly (pentabromobenzyl acrylate), tris (tribromophenyl) cyanurate, chlorinated paraffins, chlorinated polyethylene, dechlorane, magnesium hydroxide, alumina trihydrate, ammonium polyphosphate, and melamine derivatives (melamine cyanurate and/or pyrophosphate).

The composition may further comprise additional additives which are known in the art such as ultraviolet and light stabilizers, UV screeners, UV absorbers, release agents, lubricants, colorants, plasticizers, fillers, blowing agents, heat stabilizers, antioxidants, reinforcement (e.g. fibers), impact modifiers, processing aids, and other additives. The UV screeners may be for example $TiO_2$ The ultraviolet and light stabilizers may be from the family of hindered amine light stabilizers (HALS), HALS that are alkoxyamine functional hindered amines (NOR-HALS), or UV absorbers such as benzotriazole or benzophenone or a combination of them. Compositions containing tris(bromoneopentyl) phosphate, free radical initiators, and NOR-HALS have especially good UV stability.

The composition may further comprise additional fillers such as talc, calcium carbonate, mica, carbon black, of fiber reinforcement such as glass fibers and carbon fibers. The composition may further contain additives to improve electrical conductivity of the compounds.

Generally, the compositions of the present invention comprise between about 0.5% to about 20% (w/w) of tris (tribromoneopentyl) phosphate and between about 0.01% to about 4% (w/w) free radical initiator together with a polyolefin, preferably between about 0.05% to about 2% (w/w) free radical initiator together with a polyolefin. In cases where a synergistic compound is used, typically an amount from about 0.5% to about 10% (w/w) of a synergist such as antimony trioxide is used. In cases where another fire-retardant is used, typically an amount from about 0.5% to about 60% (w/w) of the fire-retardant is used.

In some instances, it is preferred to use an antimony trioxide-free system. For instance, in fiber applications in order to avoid the clogging of the spinerette during the fiber extrusion.

In many applications such as production of polypropylene fiber and multifilament, it is preferred to add the flame-retardant composition as a masterbatch concentrate in order to obtain a more homogeneous fiber, where the composition is evenly distributed. Thus the use of masterbatch concentrates allows a more stable production of PP fibers.

The masterbatch concentrate contains about 2% to about 90% (w/w) of tris(tribromoneopentyl) phosphate and about 0.03% to about 12% (w/w) of free radical initiator. Preferably, the masterbatch concentrate will contain about 25% to about 80% (w/w) of tris(tribromoneopentyl) phosphate and about 0.1% to about 10% (w/w) of free radical initiator. The masterbatch can also contain about 0.7% to about 30% (w/w) of antimony trioxide.

Due to the very stable and good mechanical properties, the polyolefin compositions of the present invention may be used in many applications. Non-limiting examples of potential use of compositions of the present invention are fibers for a textile structure, carpets, upholstery, injection products such as stadium seats, electrical parts (connectors, disconnectors and sockets), and electrical appliances, extrusion products such as profiles, pipes, sheets for roofing, films and boards for packaging and industry, insulation for cables and electric wires.

Flame-retardancy was measured using the Underwriters Laboratory standard UL 94. In some cases, a UL 94 V-2 standard is achieved, but with a very long burning time, especially in polypropylene block copolymers, which are known to be rather difficult to convert into flame-retarding copolymers (Proceedings of the Flame Retardants 2000

Conference, p. 89). For many applications, it is desirable to have a polypropylene copolymer with a short burning time. Some of the compositions of the present invention achieve this goal.

The resin composition can easily be prepared by pre-mixing prescribed amounts of a thermoplastic resin and compounding additives in a mixing machine, e.g., a Henschel mixer and a tumble mixer. The mixture is then introduced into an extruder, a kneader, a hot roll, a Banbury mixer, etc. in order to melt the resin and evenly distribute the additive throughout the resin.

EXAMPLES 1 to 4

Samples of the flame-retardant systems according to the invention have been prepared and their compositions are shown in Table 1 as flame-retardant (FR) FR blend 1 and FR blend 2. FR blend 3 and FR blend 4 were prepared for comparison purposes.

TABLE 1

| Example | 1 FR blend 1 | 2 FR blend 2 | 3 FR blend 3 | 4 FR blend 4 |
|---|---|---|---|---|
| Composition, weight % | | | | |
| Tris(tribromoneopentyl) phosphate (FR-370 - DSBG) | 90.91 | 83.33 | — | — |
| Stabilised grade of HBCD** (FR-1206 HT - DSBG) | — | — | 90.91 | — |
| Tetrabromobisphenol A bis(2,3-dibromopropyl ether) (FR-720 - DSBG) | — | — | — | 97.8 |

TABLE 1-continued

| Example | 1 FR blend 1 | 2 FR blend 2 | 3 FR blend 3 | 4 FR blend 4 |
|---|---|---|---|---|
| 2,3-Dimethyl-2,3,diphenyl butane* (CCDFB-90 - Peroxid-Chemie) | 9.09 | 16.67 | 9.09 | 2.2 |

*free radical initiator;
**Hexabromocyclododecane thermally stabilized sold by DSBG as FR-1206 HT The two additives of the compositions were weighted on Sartorius semi-analytical scales and mixed manually in a plastic bag but for better quality mixing and/or for larger quantities, the mixing operation can be done in any suitable equipment for the mixing of powder such as Loedige, Henschel, Diosna or Papenmeyer low and high speed mixers.

EXAMPLES 5 to 14

The formulations having the compositions shown in Table 2, some of them containing the flame-retardant systems according to the invention and some others used as a reference were compounded and pelletized in a Berstorff ZE25 co-rotating twin-screw extruder, with L/D=32:1.

The processing conditions to prepare and pelletize the compounds are summarized in Table 3.

The polypropylene (PP) used is characterized by its melt flow index (MFI) that is measured according to the Standard ASTM D1238-82 at 220° C. with a load of 2.16 Kg.

The pellets were dried at 70° C. for two hours in an air-circulating oven prior to injection molding on an Arburg Allrounder machine model 320S/500-150. Injection molding conditions to prepare test bars for property measurement are summarized in Table 4.

TABLE 2

| Examples | 5 | 6 | 7 | 8 | 9 | 10 | 11 | 12 | 13 | 14 |
|---|---|---|---|---|---|---|---|---|---|---|
| Composition, weight % | | | | | | | | | | |
| PP homopolymer (MFI: 10 g/10 min) | — | — | — | — | — | 83.29 | 85.75 | 69.05 | 87.9 | 84.4 |
| PP homopolymer (MFI: 3 g/10 min) | — | — | 99.2 | 97.8 | 95.6 | — | — | — | — | — |
| PP block copolymer (MFI: 4 g/10 min) | 94.7 | 93.55 | — | — | — | — | — | — | — | — |
| FR blend 1 (example 1) | 2.25 | — | 0.8 | — | — | 11 | — | — | — | — |
| FR blend 2 (example 2) | — | — | — | — | — | — | 9.6 | — | — | 10.8 |
| FR blend 3 (example 3) | — | — | — | 2.2 | 4.4 | — | — | — | — | — |
| Tris(tribromoneopentyl) phosphate (FR-370 DSBG) | — | 3 | — | — | — | — | — | 20 | — | — |
| FR blend 4 (example 4) | — | — | — | — | — | — | — | — | 9.1 | — |
| Antimony trioxide | 0.8 | 1.2 | — | — | — | 5.36 | 4.3 | 10.6 | 3 | 4.8 |
| Tinuvin 327* (Ciba Geigy) | 0.25 | 0.25 | — | — | — | 0.25 | 0.25 | 0.25 | — | — |
| Irganox 1010** (Ciba Geigy) | — | — | — | — | — | 0.1 | 0.1 | 0.1 | — | — |
| Titanium dioxide*** | 2 | 2 | — | — | — | — | — | — | — | — |

*Benzotriazole type of UV absorber;
**Hindered phenol type of antioxidant;
***White pigment

TABLE 3

| PARAMETER | UNITS | Set values | Actual values |
|---|---|---|---|
| Temperature profile: | | | |
| Feeding zone temperature ($T_1$) | ° C. | no heating | 100 |
| $T_2$ | ° C. | 180 | 187 |
| $T_3$ | ° C. | 160 | 161 |
| $T_4$ | ° C. | 180 | 183 |
| $T_5$ | ° C. | 190 | 190 |
| $T_6$ | ° C. | 190 | 193 |
| $T_7$ | ° C. | 180 | 186 |
| $T_8$ | ° C. | 200 | 200 |
| $T_9$ | ° C. | 225 | 216 |
| Temperature of melt | ° C. | | 221 |
| Screw speed | RPM | 350 | 350 |
| Ampere | A | 9 | 10 |
| Feeding rate | kg/hour | 12 | 12 |

TABLE 4

| PARAMETER | UNITS | VALUES |
|---|---|---|
| Temperature profile: | | |
| T1 (Feeding zone) | ° C. | 200 |
| T2 | ° C. | 210 |
| T3 | ° C. | 220 |
| T4 | ° C. | 230 |
| $T_5$ (nozzle) | ° C. | 230 |
| Mold temperature | ° C. | 40 |
| Injection pressure | bar | 1200 |
| Holding pressure | bar | 700 |
| Back pressure | bar | 20 |
| Injection time | sec | 0.1 |
| Holding time | sec | 10 |
| Cooling time | sec | 5 |
| Mold closing force | KN | 500 |
| Filling volume (portion) | $Cm^3$ | 17 |
| Injection speed | $Cm^3$/sec | 20 |

EXAMPLES 15 and 16

Flame-retardancy properties of molded samples using compositions of examples 5 and 6 have been compared. Flame-retardancy was measured using the Underwriters Laboratory standard UL 94 on samples with a thickness of 1.6 mm.

In the UL 94 test, a specimen is exposed vertically to a flame for 10 seconds. The specimen is ignited at the bottom and burns up. If the specimen self-extinguishes within 30 seconds, another 10 seconds application is made. Flaming droplets are allowed to fall on cotton located below the sample. If the average burning time is less than 5 seconds and the droplets do not ignite the cotton, the material is classified as 94 V-0. If the average burning time is less than 25 seconds and the droplets do not ignite the cotton, the material is classified as 94 V-1. If the average burning time is less than 25 seconds but the droplets ignite the cotton, the material is classified as 94 V-2.

The results are summarized in Table 5.

TABLE 5

| Example | 15 | 16 |
|---|---|---|
| Composition, weight % | | |
| PP block copolymer (MFI: 4 g/10 min) | 94.7 | 93.55 |
| FR blend 1 (example 1) | 2.25 | — |

TABLE 5-continued

| Example | 15 | 16 |
|---|---|---|
| Tris(tribromoneopentyl) phosphate (FR-370 DSBG) | — | 3 |
| Antimony trioxide | 0.8 | 1.2 |
| Tinuvin 327 (Ciba Geigy) | 0.25 | 0.25 |
| Titanium dioxide | 2 | 2 |
| Flame-retardancy | | |
| UL 94 (1.6 mm): | | |
| Maximum after flame time, sec | 5 | 22 |
| Total after flame time, sec | 21 | 92 |
| Cotton ignition, number | 5 | 5 |
| Class | V-2 | V-2 |

It should be noted that the composition of example 15 prepared according to the invention has significantly shorter burning times than the reference composition 16 while its content of flame-retardants and antimony trioxide is reduced.

EXAMPLE 17–19

Flame-retardancy properties of molded samples using the compositions of examples 7 to 9 have been tested. All these compositions do not contain antimony trioxide. Flame-retardancy was measured using the Underwriters Laboratory standard UL 94 on samples with a thickness of 1.6 mm. The results are summarized in Table 6.

The flame-retardancy of the composition of Example 17 is classified V-2 while it has a very low flame-retardant content of 0.8%. Furthermore, the V-2 standard is achieved despite the fact that this composition does not contain antimony trioxide frequently used as a synergist for brominated flame-retardants

TABLE 6

| Example | 17 | 18 | 19 |
|---|---|---|---|
| Composition, weight % | | | |
| PP homopolymer (MFI: 3 g/10 min) | 99.2 | 97.8 | 95.6 |
| FR blend 1 (example 1) | 0.8 | — | — |
| FR blend 3 (example 3) | — | 2.2 | 4.4 |
| Antimony trioxide | — | — | — |
| Bromine content, w % | 0.5 | 1.3 | 2.6 |
| Flame-retardancy | | | |
| UL 94 (1.6 mm): | | | |
| Maximum after flame time, sec | 11 | 90 | 10 |
| Total after flame time, sec | 71 | 411 | 47 |
| Cotton ignition, number | 5 | 5 | 5 |
| Class | V-2 | Fail | V-2 |

Comparison of the flame-retardancy properties of the compositions of examples 17–19 which do not contain antimony trioxide demonstrates the advantage of using a mixture of tris(tribromoneopentyl) phosphate and a free radical source. The composition of example 17 contains tris(tribromoneopentyl) phosphate, while the compositions of examples 18 and 19 contain FR blend 3, which is a blend between the same free radical initiator and a stabilized grade of hexabromocylcododecane (FR-1206 HT containing mainly aliphatic bromine). Table 5 demonstrates that a mixture of FR-1206 HT and a free radical initiator is much less efficient in fire retardancy than a mixture of tris (tribromoneopentyl) phosphate and a free radical source and about 3 times more bromine is needed to reach the class V-2 according to the UL 94 standard.

EXAMPLES 20–23

Flame-retardancy properties of molded samples using compositions of examples 10, 11 and 12 have been compared. Flame-retardancy was measured using the Underwriters Laboratory standard UL 94 on sample with a thickness of 1.6 mm. The results are summarized in Table 7.

Comparing the various compositions reveals that the composition of examples 20 and 21 prepared according to the invention achieve flame-retardancy standard of V-0 (with 1.6 mm thickness) having very short burning time while a loading of about twice more flame-retardant (examples 22 and 23) is needed for the composition that does not contain the free radical initiator.

TABLE 7

| Example | 20 | 21 | 22 | 23 |
|---|---|---|---|---|
| Composition, weight % | | | | |
| PP homopolymer (MFI: 10 g/10 min) | 83.29 | 85.75 | 69.5 | 69.0 |
| FR blend 1 (example 1) | 11 | — | — | — |
| FR blend 2 (example 2) | — | 9.6 | — | — |
| Tris(tribromoneopentyl) phosphate (FR-370 DSBG) | — | — | 17.5 | 20 |
| Antimony trioxide | 5.36 | 4.3 | 12.6 | 10.6 |
| Tinuvin 327* (Ciba Geigy) | 0.25 | 0.25 | 0.25 | 0.25 |
| Irganox 1010** (Ciba Geigy) | 0.1 | 0.1 | 0.1 | 0.1 |
| Flame-retardancy UL 94 (1.6 mm): | | | | |
| Maximum after flame time, sec | 1 | 1 | 1 | 1 |
| Total after flame time, sec | 10 | 10 | 5 | 10 |
| Cotton ignition, number | 0 | 0 | 3 | 0 |
| Class | V-0 | V-0 | V-2 | V-0 |

*Benzotriazole type of UV absorber;
**Hindered phenol type of antioxidant

EXAMPLES 24–25

UV stability and appearance after thermal aging have been compared for compositions 13 and 14. Composition 14 is prepared with the FR blend 2 according to the invention while composition 13 has been flame-retarded with FR blend 4, which is based on tetrabromobisphenol A bis(2,3-dibromopropyl ether), a flame-retardant particularly recommended for polypropylene applications. Molded samples prepared with these two compounds are classified V-0 according to the UL 94 standard.

Table 8 shows that the sample of example 25 prepared according to the invention has a much better UV stability measured by the color change after 300 hours of exposure and also does not bloom significantly. On the other hand, the samples produced in the example 24 have significant blooming and have poor UV stability.

TABLE 8

| Example | 24 | 25 |
|---|---|---|
| Composition, weight % | | |
| PP homopolymer (MFI: 10 g/10 min) | 87.9 | 84.4 |
| FR blend 2 (example 2) | — | 10.8 |
| FR blend 4 (example 4) | 9.1 | — |
| Antimony trioxide | 3 | 4.8 |
| Flame-retardancy UL 94 (1.6 mm): | | |
| Class | V-0 | V-0 |
| Blooming properties (2 weeks 80° C.) | + +* | 0* |
| UV stability (Xenotest - ASTM 300 h): | | |
| Initial color DE | 6 | 6 |
| Color after 300 h exposure | 17 | 30 |

*+ + Represents significant blooming; 0 represents no significant blooming

EXAMPLE 26 and 27

In these examples, thermal stability properties of the FR blend 1 prepared in example 1 have been compared with another flame-retardant containing only aliphatic bromine, a stabilized grade of hexabromocyclododecane (Stabilized HBCD SP-75 produced by Great Lakes Chemical Corporation).

The thermal stability has been measured by isothermogravimetric analysis at 230° C. The results are given in Table 9.

It can be seen that the FR blend 1 (example 1) according to the invention loses less than 10% of its weight after 20 minutes at 230° C. while a stabilized grade of hexabromocyclododecane (SP-75—Great Lakes Chemical Corporation) loses 10% of its weight after only 9 minutes.

TABLE 9

| Example | 26 | 27 |
|---|---|---|
| Flame-retardant | FR blend 1 (Example 1) | Stabilized HBCD (SP-75 Great Lakes) |
| Isothermal thermogravimetric analysis at 230° C. Time to lose 10% weight, minutes | More than 20 | 9 |

EXAMPLE 28 and 29

In these examples, masterbatch concentrates have been prepared with the FR blend 1 given in example 1.

Table 10 shows the compositions and the processing conditions to produce typical flame-retardant masterbatch concentrates prepared with the FR blend 1 given in example 1. Example 29 contains antimony trioxide, which acts as a synergist.

TABLE 10

| Example | 28 | 29 |
|---|---|---|
| Composition, w %: | | |
| FR blend 1 (example 1) | 40 | 34 |
| Antimony trioxide | — | 15.2 |
| PP homopolymer (MFI: 20 g/10 min) | 60 | 50.8 |
| Processing condition: | | |
| Compounding extruder | Berstorff ZE25 co-rotating twin-screw extruder, with L/D = 32:1 | |
| Temperature profile, ° C. | 100-160-160-180-190-190-180-180-200 | |
| Speed, Rpm | 350 | |
| Throughput, Kg/h | 15 | |

EXAMPLES 30–33

The formulations having the compositions shown in Table 11 were prepared in the same way as the formulations in Examples 5–14. The test bars obtained were subjected to flammability testing according to the UL 94 standard at 1.6 mm thickness. Accelerated weathering was made by UV radiation by using a QUV tester made by the Q Panel Company using 313 lamps and panel temperature of 55° C. The color change of the test samples was recorded after the exposure time as shown. Test results are summarized in the table.

TABLE 11

COLOR CHANGE IN QUV/P.P WITH FR-370, FR-720

| Example | | 30 | 31 | 32 | 33 |
|---|---|---|---|---|---|
| Reference Number | | -1068 49 7. | -1068 49 1–7. | -1268 14 5. | -1268 14 14. |
| P.P R-50E HOMOPOLYMER CAPILENE | % | 83.2 | 83.2 | 87.2 | 89 |
| Tris(tribromoneopentyl) phosphate (FR-370 DSBG) | % | 9 | 9 | | |
| Tetrabromobisphenol A bis(2,3-dibromopropyl ether) (FR-720-DSBG) | % | | | 8.9 | 7.42 |
| 2,3-Dimethyl-2,3,diphenyl butane (CCDFB-90-Peroxid-Chemie) | % | 1.8 | 1.8 | 0.2 | 0.5 |
| A.O L-0112 M.B * ex KAFRIT | % | 6 | 6 | 3.7 | 3.08 |
| CGL 116 ex Ciba NOR-HALS type UV stabilizer | % | | 0.3 | | |
| UL-94 | | V-0 | V-0 | V-0 | V-0 |
| COLOR CHANGE QUV | | | | | |
| 100 hr exposure | DE | 10.3 | 10.2 | 24.2 | 23.2 |
| 280 hr exposure | DE | 9.1 | 8.5 | 25.9 | 25 |
| 460 hr exposure | DE | 9.5 | 7.8 | 32.2 | 29.9 |
| 595 hr exposure | DE | 12.6 | 7.2 | 35.4 | 33.1 |

* Masterbatch containing 80% antimony trioxide

This example is another demonstration of the excellent flame-retardancy which may be obtained from formulations containing brominated FR and free radical initiator.

The UV light stability of the formulation containing FR370 according to the present invention is much better than the comparative formulation with FR720 (lower color change). It can also be seen that after long exposure time, the formulation with both FR 370 and NOR-HALS UV stabilizer has a better UV stability than the formulation without NOR-HALS.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claim is:

1. A flame-retardant polyolefin composition comprising:
   (i) at least one polyolefin;
   (ii) tris (tribromoneopentyl) phosphate;
   (iii) a free radical source; and
   (iv) an additional flame retarding compound,
   wherein the polyolefin resin is polypropylene.

2. A flame-retardant thermoplastic polyolefin composition comprising:
   (i) at least one polyolefin resin of molding grade, fiber grade, film grade or extrusion grade;
   (ii) tris (tribromoneopentyl) phosphate; and
   (iii) a free radical source which is stable at processing temperature of 150° C. to 250° C.,
   further comprising an additional flame-retarding compound,
   wherein the polyolefin resin is polypropylene.

3. A flame-retardant polyolefin composition comprising:
   (i) at least one polyolefin;
   (ii) tris (tribromoneopentyl) phosphate; and
   (iii) a free radical source which is 2,3-dimethyl-2,3-diphenyl-butane or 2,3-dimethyl-2,3-diphenyl-hexane.

4. A flame-retardant thermoplastic polyolefin composition comprising:
   (i) at least one polyolefin;
   (ii) tris (tribromoneopentyl) phosphate; and
   (iii) a free radical source which is 2,3-dimethyl-2,3-diphenyl-butane or 2,3-dimethyl-2,3-diphenyl-hexane, and
   further comprising an additional flame-retarding compound.

5. A fiber comprising:
   (i) At least one polyolefin;
   (ii) tris(tribromoneopentyl) phosphate; and
   (iii) a free radical source.

6. A fiber according to claim 5 further comprising an additional flame-retarding compound.

7. A fiber according to claim 6, wherein the additional flame-retarding compound is selected from the group consisting of antimony compounds, tin compounds, molybdenum compounds, zirconium compounds, boron compounds, zinc compounds, silicone compounds, fluoro compounds, hydroxystannate and any mixtures of two or more of them.

8. A fiber according to claim 6, wherein the fire-retarding compound is selected from the group consisting of antimony-trioxide, antimony-tetraoxide, antimony-pentaoxide, sodium antimonate, tin-oxide, tin-hydroxide, molybdenum-oxide, ammonium molybdate, zirconium-oxide and zirconium-hydroxide, zinc-borate, barium-metaborate, zinc stannate, silicone oil, polytetrafluoroethylene, hydroxystannate and any mixtures of two or more of them.

9. A fiber according to claim 6, wherein the additional flame-retarding compound is a halogenated or non-halogenated compound selected from the group consisting of
   tetrabromobisphenol A bis (2,3-dibromopropyl ether),
   brominated expoxy resins,
   brominated diphenyl ethers,
   tetrabromobisphenol A,
   hexabromocyclododecane,
   chlorinated paraffins,
   chlorinated polyethylene,
   1,2,3,4,7,8,9,10,13,13,14,14-dodecachloro-1,4, 4a, 5,6, 6a, 7,10,10a, 11,12, 12a-dodecahydro-1,4,7,10-dimethano-dibenzo(a,e)cyclooctene,
   magnesium hydroxide,
   alumina trihydrate,
   ammonium polyphosphate,
   melamine cyanurate, and
   melamine pyrophosphate and
   mixtures thereof.

10. A fiber according to claim 5, wherein the polyolefin resin is polypropylene, polyethylene, a block copolymer of ethylene and propylene, or a random copolymer of ethylene and propylene, said resin being in a molding grade, fiber grade, film grade or extrusion grade.

11. A fiber according to 10 wherein the polyolefin resin is polypropylene.

12. A fiber according to claim 6, wherein the polyolefin resin is polypropylene, polyethylene, a block copolymer of ethylene and propylene, or a random copolymer of ethylene and propylene, said resin being in a molding grade, fiber grade, film grade or extrusion grade.

13. A fiber according to 12 wherein the polyolefin resin is polypropylene.

14. A fiber according to claim 5, wherein the free radical source is stable at processing temperatures of from about 150° C. to about 250° C., and which further decomposes at temperatures of from about 220° C. to about 350° C.

15. A fiber according to claim 14, where the free radical source is 2,3-dimethyl-2,3-diphenyl-butane or 2,3-dimethyl-2,3-diphenyl-hexane.

16. A fiber according to claim 6, wherein the free radical source is stable at processing temperatures of from about 150° C. to about 250° C., and which further decomposes at temperatures of from about 220° C. to about 350° C.

17. A fiber according to claim 16, where the free radical source is 2,3-dimethyl-2,3-diphenyl-butane or 2,3-dimethyl-2,3-diphenyl-hexane.

18. A fiber according to claim 6, wherein the amount of tris(tribromoneopentyl) phosphate is from about 0.5% to about 20% (w/w), the amount of the free radical source is from about 0.01% to about 4% (w/w) and the amount of the additional fire retardant component is from about 0.5% to about 10% (w/w).

19. A fiber according to claim 5 further comprising at least one additive selected from the group consisting of hindered amine UV light stabilizers that are alkoxyamine functional hindered amines, UV screeners, UV absorbers, release agents, lubricants, colorants, plasticizers, fillers, blowing agents, heat stabilizers, antioxidants, fiber reinforcement, impact modifiers, and processing aids.

20. A fiber according to claim 6 further comprising at least one additive selected from the group consisting of hindered amine UV and light stabilizers that are alkoxyamine functional hindered amines, UV screeners, UV absorbers, release agents, lubricants, colorants, plasticizers, fillers, blowing agents, heat stabilizers, antioxidants, fiber reinforcement, impact modifiers, and processing aids.

21. A textile structure comprising a plurality of fibers, wherein the fibers are composed according to claim 6.

22. A textile structure comprising a plurality of fibers, wherein the fibers are composed according to claim 6.

23. A method for improving the flame-retardancy of a polyolefin resin by using a masterbatch concentrate comprising about 2% to about 90% (w/w) of tris(tribromoneopentyl) phosphate, about 0.03% to about 12% (w/w) of free radical initiator, and optionally about 0.7% to about 30% (w/w) of antimony trioxide.

24. A method according to claim 23 wherein the masterbatch concentrate comprises about 25% to about 80% (w/w) of tris(tribromoneopentyl) phosphate and about 0.1% to about 10% (w/w) of free radical initiator.

25. An injection or extrusion molded thermoplastic object comprising:
(i) at least one polyolefin;
(ii) tris(tribromoneopentyl) phosphate; and
(iii) a free radical source which is 2,3-dimethyl-2,3-diphenyl-butane or 2,3-dimethyl-2,3-diphenyl-hexane.

26. An injection or extrusion molded object comprising:
(i) at least one polyolefin;
(ii) tris (tribromoneopentyl) phosphate; and
(iii) a free radical source which is 2,3-dimethyl-2,3-diphenyl-butane or 2,3-dimethyl-2,3-diphenyl-hexane, and further comprising an additional flame-retarding compound.

27. A fiber according to claim 17, wherein the amount of said free radical source is from 0.05% to 2% (w/w).

28. A flame-retardant polyolefin composition according to claim 1, wherein the polyolefin is selected from the group consisting of a homopolymer or copolymer.

29. A flame-retardant composition according to claim 1, wherein the additional flame-retarding compound is selected from the group consisting of antimony compounds, tin compounds, molybdenum compounds, zirconium compounds, boron compounds, zinc compounds, silicon compounds, fluoro compounds, hydroxystannate and any mixtures of two or more of them.

30. A flame-retardant composition according to claim 1, wherein the additional flame-retarding compound is selected from the group consisting of antimony-trioxide, antimony-tetraoxide, antimony-pentaoxide, sodium antimonate, tin-oxide, tin-hydroxide, molybdenum-oxide, ammonium molybdate, zirconium-oxide and zirconium-hydroxide, zinc-borate, barium-metaborate, zinc stannate, silicone oil, polytetrafluoroethylene, hydroxystannate and any mixtures of two or more of them.

31. A flame-retardant composition according to claim 1, wherein the additional flame-retarding compound is a halogenated or non-halogenated compound selected from the group consisting of tetrabromobisphenol A bis (2,3-dibromopropyl ether), brominated expoxy resins, brominated diphenyl ethers, tetrabromobisphenol A, hexabromocyclododecane, chlorinated paraffins, chlorinated polyethylene, 1,2,3,4,7,8,9,10,13,13,14,14-dodecachloro-1,4,4a,5,6,6a,7,10,10a,11,12,12a-dodecacahydro-1,4,7,10-dimethanodibenzo (a,e) cyclooctene magnesium hydroxide, alumina trihydrate, ammonium polyphosphate, melamine cyanurate, melamine pyrophosphate, and any mixture of two or more of them.

32. A flame-retardant polyolefin composition according to claim 1, wherein the amount of tris(tri-bromoneopentyl) phosphate is from about 0.5% to about 20% (w/w), the amount of the free radical source is from about 0.01% to about 4% (w/w), and the amount of the additional fire retardant component is from about 0.5% to about 10% (w/w).

33. A flame-retardant polyolefin composition according to claim 1 further comprising at least one additive selected from the group consisting of hindered amine UV and light stabilizers that are alkoxyamine functional hindered amines, UV screeners, UV absorbers, release agents, lubricants, colorants, plasticizers, fillers, blowing agents, heat stabilizers, antioxidants, fiber reinforcement impact modifiers, and processing aids.

34. A flame-retardant thermoplastic polyolefin composition according to claim 3, wherein the polyolefin is polypropylene.

35. A flame-retardant polyolefin composition according to claim 3 further comprising at least one additive selected from the group consisting of hindered amine UV and light stabilizers that are alkoxyamine functional hindered amines, UV screeners, UV absorbers, release agents, lubricants, colorants, plasticizers, fillers, blowing agents, heat stabilizers, antioxidants, fiber reinforcement, impact modifiers, and processing aids.

36. A flame-retardant thermoplastic polyolefin composition according to claim 4, wherein the polyolefin is polypropylene, polyethylene, a block copolymer of ethylene and propylene, or a random copolymer of ethylene and propylene, said resin being in a molding grade, fiber grade, film grade or extrusion grade.

37. A flame-retardant thermoplastic polyolefin composition according to claim 4, wherein the polyolefin is polypropylene.

38. A flame-retardant composition according to claim 4, wherein the additional flame-retarding compound is selected from the group consisting of antimony compounds, tin compounds, molybdenum compounds, zirconium compounds, boron compounds, zinc compounds, silicon compounds, fluoro compounds, hydroxystannate and any mixtures of two or more of them.

39. A flame-retardant composition according to claim 4, wherein the additional flame-retarding compound is selected from the group consisting of antimony-trioxide, antimony-tetraoxide, antimony-pentaoxide, sodium antimonate, tin-oxide, tin-hydroxide, molybdenum-oxide, ammonium molybdate, zirconium-oxide and zirconium-hydroxide, zinc-borate, barium-metaborate, zinc stannate, silicone oil, polytetrafluoroethylene, hydroxystannate and any mixtures of two or more of them.

40. A flame-retardant composition according to claim 4, wherein the additional flame-retarding compound is a halogenated or non-halogenated compound selected from the group consisting of tetrabromobisphenol A bis (2,3-dibromopropyl ether),
brominated expoxy resins,
brominated diphenyl ethers,
tetrabromobisphenol A,
hexabromocyclododecane,
chlorinated paraffin,
chlorinated polyethylene,
1,2,3,4,7,8,9,10,13,13,14,14-dodecachloro-1,4,4a,5,6,6a,7,10,10a,11,12,12a-dodecacahydro-1,4,7,10-dimethanodibenzo (a,e) cyclooctene
magnesium hydroxide,
alumina trihydrate,
ammonium polyphosphate,
melamine cyanurate,
melamine pyrophosphate, and
any mixture of two or more of them.

41. An injection or extrusion molded thermoplastic object according to claim 25 wherein the polyolefin is polypropylene.

42. An injection or extrusion molded thermoplastic object according to claim 26 wherein the polyolefin is polypropylene.

43. An injection or extrusion molded object according to claim 26, wherein the additional flame-retarding compound is selected from the group consisting of antimony compounds, tin compounds, molybdenum compounds, zirconium compounds, boron compounds, zinc compounds, silicone compounds, fluoro compounds, hydroxystannate and any mixtures of two or more of them.

44. An injection or extrusion molded object according to claim 26, wherein the additional fire-retarding compound is selected from the group consisting of antimony-trioxide, antimony-tetraoxide, antimony-pentaoxide, sodium antimonate, tin-oxide, tin-hydroxide, molybdenum-oxide, ammonium molybdate, zirconium-oxide and zirconium-hydroxide, zinc-borate, barium-metaborate, zinc stannate, silicone oil, polytetrafluoroethylene, hydroxystannate and any mixtures of two or more of them.

45. A flame-retardant composition according to claim 26, wherein the additional flame-retarding compound is a halogenated or non-halogenated compound selected from the group consisting of tetrabromobisphenol A bis(2,3-dibromopropyl ether),
brominated expoxy resins,
brominated diphenyl ethers,
tetrabromobisphenol A,
hexabromocyclododecane,
chlorinated paraffins,
chlorinated polyethylene,
1,2,3,4,7,8,9,10,13,13,14,14-dodecachloro-1,4,4a,5,6,6a,7,10,10a,1,12,12a-dodecacahydro-1,4,7,10-dimethanodibenzo (a,e) cyclooctene,
magnesium hydroxide,
alumina trihydrate,
ammonium polyphosphate,
melamine cyanurate,
melamine pyrophosphate, and
any mixture of two or more of them.

* * * * *